United States Patent [19]

Fung et al.

[11] 4,444,897
[45] Apr. 24, 1984

[54] REACTIVATING IRIDIUM-CONTAINING CATALYSTS WITH HYDROGEN HALIDE AND OXYGEN

[75] Inventors: Shun C. Fung, Bridgewater; Walter Weissman, Berkeley Heights; James L. Carter, Westfield; Walter S. Kmak, Scotch Plains, all of N.J.

[73] Assignee: Exxon Research and Engineering Co., Florham Park, N.J.

[21] Appl. No.: 374,978

[22] Filed: May 5, 1982

[51] Int. Cl.³ .......................... B01J 23/96; B01J 23/46; B01J 23/64; C10G 35/085
[52] U.S. Cl. ...................... 502/37; 208/140; 502/35; 502/230
[58] Field of Search ............... 252/415, 441, 442; 208/140; 502/35, 36, 37, 230

[56] References Cited

U.S. PATENT DOCUMENTS

| | | | |
|---|---|---|---|
| 3,622,520 | 11/1971 | Hayes | 208/415 |
| 3,625,860 | 12/1971 | Condrasky | 208/415 |
| 3,673,109 | 6/1972 | Georgescu et al. | 252/415 |
| 3,904,510 | 9/1975 | Sinfelt et al. | 208/140 |
| 3,937,600 | 2/1976 | Yates et al. | 208/140 |
| 3,939,061 | 2/1976 | Paynter et al. | 208/140 |
| 3,939,062 | 2/1976 | Sinfelt et al. | 208/140 |
| 3,941,682 | 3/1976 | Kmak et al. | 208/140 |
| 3,941,716 | 3/1976 | Paynter | 252/415 |
| 3,943,052 | 3/1976 | Kmak et al. | 208/140 |
| 3,981,823 | 9/1976 | Yates | 252/415 |
| 3,998,755 | 12/1976 | Hayes | 252/415 |
| 4,046,673 | 9/1977 | Paynter et al. | 208/140 |
| 4,133,743 | 1/1979 | Boret et al. | 252/415 |
| 4,159,938 | 7/1979 | Lewis | 208/139 |
| 4,172,817 | 10/1979 | Yates et al. | 208/140 |
| 4,192,771 | 3/1980 | Burbidge et al. | 252/415 |
| 4,359,400 | 11/1982 | Landolt et al. | 208/140 |

FOREIGN PATENT DOCUMENTS

| | | |
|---|---|---|
| 57551 | 11/1982 | European Pat. Off. . |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North

[57] ABSTRACT

A process is disclosed for reactivating an agglomerated iridium-containing catalyst and particularly platinum-iridium on alumina reforming catalysts. The process includes contacting a substantially decoked agglomerated catalyst with a reducing gas such as hydrogen to reduce agglomerated iridium oxides present to the free metal, a hydrogen halide pretreatment step to increase the halogen level of the catalyst to about 1.3 weight percent and above, and a redispersion step involving hydrogen halide and elemental oxygen. Use of hydrogen halide and elemental oxygen in the redispersion treatment eliminates the need for use of elemental chlorine gas. If no iridium oxides are initially present, the hydrogen reduction step is optional.

21 Claims, No Drawings

REACTIVATING IRIDIUM-CONTAINING CATALYSTS WITH HYDROGEN HALIDE AND OXYGEN

BACKGROUND OF THE INVENTION

This invention relates to a process for reactivating agglomerated iridium-containing catalysts which can be partially or completely decoked in which the catalyst is reduced, if iridium oxides are present, pretreated with a halide-providing compound preferably hydrogen chloride and contacted with hydrogen halide and elemental oxygen to redisperse the metal on the catalyst surface.

SUMMARY OF THE INVENTION

It has been found that iridium-containing catalysts containing agglomerated metallic iridium and/or iridium oxides can be efficiently redispersed and reactivated by the use of a mixture of hydrogen halide and elemental oxygen. The redispersion step in this manner is performed subsequent to a halide pretreatment, following decoking and reduction of the metal oxides, if present. Temperature of the redispersion is conducted generally in the range of about 450° to 600° C. with volume ratios of elemental oxygen/hydrogen halide in the range of about 1:5 to 100:1. Redispersion by the subject process generally leads to metal redispersion values of about 75 percent to 100 percent.

The halide pretreatment step is conducted with two limitations, (1) that about 1.3 weight percent halide and above, and preferably 1.4 to 2.5 weight percent halide, based on the coke-free, dry catalyst, and most preferably saturated with halide under the conditions used, is present on the catalyst after the pretreatment and maintained at, or above this level up to, and during the subsequent hydrogen halide/oxygen redispersion step, and (2) that during the halide pretreatment step, no elemental oxygen is present in the feedstream or is generated, in situ. If this halide level is not maintained during subsequent redispersion and if elemental oxygen is present during the pretreatment then substantially lower redispersion values will be obtained with concomitant decrease in catalyst metal surface area and activity.

The subject process is applicable to a wide variety of iridium-containing catalysts and particularly to reforming catalysts employing platinum-iridium on alumina, which are completely or partially decoked.

Generally, halide-providing compounds are used in the pretreatment step, including organic halides and hydrogen halides with gaseous hydrogen chloride being the preferred hydrogen halide-providing compound used in the pretreatment and chloride levels of about 1.3 weight percent and above on the catalyst surface are necessary to insure effective subsequent redispersion. The halide weight percent is expressed on the basis of the dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating an agglomerated catalyst containing metallic iridium comprising the steps of:

(a) pretreating the catalyst by contact with substantially elemental oxygen-free atmosphere comprising a halide-providing compound at elevated temperature, to provide about 1.3 weight percent and above halide to the catalyst, based on the coke-free, dry catalyst; and (b) dispersing the metallic iridium from step (a) by contact with an atmosphere comprising hydrogen halide and elemental oxygen at elevated temperature.

A further embodiment of the process is where the agglomerated catalyst further initially contains iridium oxide which is contacted with a reducing atmosphere at elevated temperature to substantially convert said iridium oxide to metallic iridium prior to step (a).

DESCRIPTION OF THE INVENTION AND PREFERRED EMBODIMENTS

The novel process of the present invention includes a halide pretreatment step prior to a hydrogen halide/oxygen redispersion step. This combination of steps in sequence enhances the potential of the process for monocycle reactivation/redispersion and eliminates the need, as practiced in the prior art, for rigorous, extended multi-cycle hydrogen/halogen treatment to achieve high redispersion values.

Catalysts which can be treated by the subject process include generally, iridium-containing catalysts, with and without co-catalysts, preferably being supported. Other metallic co-catalysts, which can be present with iridium, which are applicable in the process, include metals such as, for example, platinum, rhodium, rhenium, palladium, mixtures thereof and the like. The metals can be present in bimetallic, trimetallic combinations and higher combinations, as alloys, or physical mixtures, on the same support particles or where the metals are individually present on separate support particles. Preferred metal combinations in the catalyst for treatment by the subject process are platinum-iridium, and platinum-iridium-rhenium.

The metals can be supported on a suitable support, which is conventional, with the proviso that the support is stable during the pretreatment process and does not undergo any deleterious reactions. Representative examples include silica, zeolites, alumina, silica-alumina, zirconia, alumina-zirconia, mixtures thereof and the like. In general, the active metallic components, if supported, are present in an amount of preferably up to about 10 weight percent of the supported catalyst.

A preferred catalyst which can be reactivated in the process is agglomerated platinum-iridium, preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iridium by hydrogen gas. Also, hydrogen stripping at high temperature, preferably about 450° to 600° C., will result in partial removal of coke deposits and leave the agglomerated iridium in a metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated, coked catalysts are usually industrially decoked by an oxygen burn-off of carbon deposits. Generally, a typical used catalyst from industrial operation may contain up to about 6 weight percent of carbon deposits and may be agglomerated after the decoking step up to about a 100 percent extent, as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up to about 100 Å and greater in crystallite size. Decoking of the catalyst can be conducted under a variety of conditions, but is generally conducted by heating in an atmosphere containing 0.01 to 10 volume percent $O_2$ at a temperature of about 400° to 550° C., to remove surface and embedded carbon deposits and particularly, "active" carbon deposits which can react with halogen during the redispersion step to form halogenated species which are not readily removed from the catalyst surface. Generally, about 60 to 100 weight percent of carbon deposits can be removed in the decoking step. For example, U.S. Pat. No. 3,904,510 describes a typical procedure employed in decoking. The subject process is applicable to a wide range of agglomerated catalysts containing varying amounts of remaining carbon deposits, different degrees of agglomeration, varying particle size ranges and varying impurities.

An optional first step in the subject process is wherein said partially or completely decoked agglomerated catalyst is treated with a reducing atmosphere, generally comprising hydrogen gas, to reduce primarily metal oxides and oxide layers which may be present on agglomerated metallic iridium particles formed during decoking and as a further aid in removing residual active carbon deposits from the decoking step. If no metallic oxides are present, then the reduction step, as described herein, is not mandatory. However, if metallic oxides are present, the reduction step must be conducted in order to achieve high values of redispersion. Other reducing or inert gases may also be present, including nitrogen, helium and the like. The reducing step is generally conducted by contacting the catalyst at an elevated temperature, generally in the range of about 250° to 600° C., preferably about 300° to 540° C. in a reducing atmosphere comprising about one volume percent hydrogen gas or above, for a time to substantially reduce metal oxides present to the free metal, as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns, as taken on the same catalysts used in reforming, from which coke has been burned in numerous cycles of use, generally show distinct metal lines which indicate highly agglomerated metal particles of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent, and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75 to 100 percent and preferably about 90 to 100 percent. Generally, time requirements for the reduction will be in the range from about one to several hours, depending on the process conditions. Shorter and longer times are also applicable.

Following the reduction step, if performed, the decoked-reduced catalyst is then subjected to halide pretreatment with a halide-providing compound and by the term is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof and the like. When using haloorgano compounds, hydrogen, in a large excess over the stoichiometric amount, must also be used to convert the haloorgano compound to a hydrogen halide.

The hydrogen halides can be hydrogen fluoride, hydrogen chloride, hydrogen bromide, or hydrogen iodide. Preferably, hydrogen chloride is the halide-providing compound used in the process. The atmosphere contacting the catalyst in this step can contain other inert gases, e.g., nitrogen and the like, and also including water vapor for more uniform distribution of halide on the catalyst surface prior to the halogenation treatment, and also preferably hydrogen gas or reducing gas, in an amount of about 1–2 volume percent to insure that the reduced catalyst remains in the reduced state during hydrogen halide pretreatment. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen being present.

The temperature of the halide pretreatment is generally conducted in the range of about 250° to 600° C. and preferably about 300° to 540° C., and the halide-providing compound, at the above-identified temperature, is contacted with the catalyst in a gaseous stream until about 1.3 weight percent halide or above, is provided to the catalyst as detected, for example, by X-ray fluorescence. Preferably, the catalyst is pretreated to a range of about 1.4 to 2.5 weight percent halide, or higher, most preferably up to saturation by halide of the catalyst surface under the process conditions. As described hereinabove, the weight percentage of halide provided to the catalyst is taken as about 1.3 weight percent, said catalyst taken on a dry and coke-free basis. Where the catalyst has been extensively used in commercial processes, having a lower surface area and catalytic activity as a result of this continued use, a minimum weight percentage of about one percent halide is reasonably believed to be effective in promoting high redispersion values in the subject process. For example, fresh catalysts having BET surface areas of 180 m$^2$/g and higher, will require 1.3 weight percent halide and above. Used catalysts having surface areas of about 100 to 180 m$^2$/g will generally require a minimum of 1 to 1.3 weight percent halide prior to redispersion. However, an exact minimum value cannot be stated for a commercial spent catalyst, due to large variances in surface area, coke deposits, impurities and poisons present, and the like. One skilled in the art, however, will be able to utilize this disclosure successfully for efficient redispersion. It is important that the halide content be maintained up to the hydrogen halide/oxygen redispersion treatment. If a "purge" of hydrogen, nitrogen, water, mixtures thereof, or other materials is used subsequent to the halide pretreatment, then such purge or contacting should not reduce the halide level to below about 1.3 weight percent. If this happens, then the halide pretreatment should again be conducted to insure about 1.3 weight percent halide or above, being present. This is particularly true in cases where multi-cycle treatment may be necessary in which the weight percent of halide present on the catalyst must be replenished again to about 1.3 weight percent or above, prior to each hydrogen halide/oxygen redispersion treatment.

The halide pretreatment is conducted for sufficient time to achieve a halide loading, as described above. In practice, a fast flowing stream of preferably hydrogen chloride is contacted with the catalyst up to, and slightly beyond breakthrough. By the term "breakthrough" is meant the first visible detection by an analytical method such as, for example, color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application, by approximately about 0.4 weight percent, but generally results in a more uniform halide distribution. Thus, saturation by dry HCl of a coke-free, dry catalyst will result in up to about a 2.8 weight percent halide loading, whereas saturation with a wet stream of HCl will result in up to about 2.4 weight percent, or even slightly lower, halide loading. Preferably, the HCl treatment is conducted under dry conditions.

Time required for the halide pretreatment will, of course, be dependent on many factors including flow rate, hydrogen halide gaseous concentrations, amount of catalyst and can be desirably adjusted, for example, to run for about 1 to 3 hours per catalyst regeneration in general. Concentration of hydrogen halide can be from 0.05 to about 5 volume percent, or higher, in the feedstream, which can be at a total pressure of about 0.1 to 2.0 MPa. Higher and lower values of both variables can also be used effectively.

Following the halide pretreatment step, the catalyst is then subjected to a hydrogen halide/oxygen redispersion step by contacting the catalyst with a mixture of hydrogen halide and oxygen. Hydrogen halide gases applicable are hydrogen fluoride, hydrogen chloride, hydrogen bromide and hydrogen iodide with hydrogen chloride being a preferred embodiment.

The redispersion step is generally carried out at a temperature of about 450° to 600° C. and preferably about 500° to 540° C.

The hydrogen halide/oxygen atmosphere in the redispersion generally contains oxygen/hydrogen halide in a volume ratio of about 1:5 to 100:1, preferably about 2:1 to 60:1, and most preferably about 4:1 to 20:1. The elemental oxygen also acts to remove residual carbon deposits from the decoking step. However, the presence of oxygen is necessary in the metal redispersion process.

The gaseous hydrogen halide/oxygen atmosphere may also contain inert gases such as nitrogen or helium as carrier gases, carbon dioxide present from combustion processes, and also water vapor. Preferably, water is not present, but if present, is in an amount of about 0.05 to 2 volume percent.

Concentration of hydrogen halide in the feedstream can be from about 0.05 to 5 volume percent, or higher, which can be at a total pressure of about 0.1 to 2.0 MPa. Higher and lower values of both variables can also be used effectively. The redispersion is generally conducted until oxygen breakthrough occurs, as evidenced or detected, for example, by an oxygen analyzer. Generally, this requires about 0.5 to 2 hours of treatment for used catalyst, which depends upon flow rate, preferably being below a space velocity of about 4000 v/v/hr., concentrations of hydrogen halide and oxygen in the feedstream and amount of catalyst. Generally, however, slightly longer times of treatment are required for substantially complete redispersion, as evidenced by the absence of crystalline metal or metal oxide lines in the X-ray diffraction patterns. Preferably, a time of about 30 to 90 minutes past breakthrough, i.e., substantially past breakthrough, is necessary for substantially complete redispersion.

Operation past breakthrough of the hydrogen halide/oxygen feedstream is preferred to avoid redispersion gradients along the catalyst bed of redispersed iridium metal. Where gradients are present, usually percent redispersion regions of iridium metal are high at the back part (exit) of the reactor but decrease towards the front (entrance) of the reactor.

By carrying out the process described herein, substantially complete redispersions of iridium-containing catalysts have been achieved and particularly those of platinum-iridium on alumina used in hydrocarbon reforming operations. In the latter case, 75 to 100 percent redispersion of both the platinum and iridium agglomerated metals have been achieved in the process. The number of cycles necessary should preferably be one. However, in certain cases such as where minimum treatment past oxygen breakthrough is desired, multi-cycle treatment may prove necessary with concomitant need for additional pretreatment steps, as described hereinabove.

By the term "substantially complete redispersion" as used herein, is meant redispersion values, as determined by X-ray diffraction, of greater than about 55 numerical percent and preferably about 75 to 100 numercial percent of iridium on the catalyst surface, also including other metals where present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of the halide content to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

The following examples are illustrative of the best mode of carrying out the instant invention, as contemplated by the inventors, and should not be construed as being limitations on the scope or spirit of the instant invention.

EXAMPLE 1

Into a quartz tubular, horizontal reactor was charged about 60 grams of a coke-free platinum-iridium on alumina catalyst, wherein 100% of the iridium was agglomerated. It contained 0.3 weight percent iridium and 0.3 weight percent platinum, based on the total weight of the catalyst (BET surface area of 200 m$^2$/g. The catalyst was divided into three approximately equal sections with quartz wool plugs as spacers between the sections. The catalyst in Section 1 (S-1 in the Table) was at the entry of the reactor and the catalyst in Section 3 (S-3 in the Table) was at the reactor exit. The chloride level on this catalyst was 0.67 weight percent, as determined by X-ray fluorescence.

The catalyst was treated with a gaseous mixture of 20 percent hydrogen and 1.4 percent water in helium at one atmosphere for 2 hours at 524° C., whereby substantially all of the iridium oxide was reduced to metallic iridium, as evidenced by the absence of the X-ray diffraction line at 28.05 degrees (2θ) ascribed to IrO$_2$. The hydrogen was purged from the catalyst bed with helium. The catalyst was then treated with a gaseous mixture of 1.1 volume percent hydrogen chloride and 1.4 volume percent water in helium at 500 cc/min. After about 83 minutes, hydrogen chloride was detected at the reactor outlet. Hydrogen chloride treatment was continued until concentration of hydrogen chloride at the reactor outlet was about 90 percent of that at the reactor inlet. This required about 15 minutes. At this point, 2.4 volume percent of oxygen was added to the gaseous mixture and the HCl/O$_2$ treatment continued for 200 minutes. The catalyst was then rereduced with 20 volume percent hydrogen and 1.4 volume percent water in helium for 75 minutes. The results are shown below in the Table.

The results for Example 1 are listed below in the Table under abbreviated columns for "% Iridium Agglomeration", "% IrO$_2$ Agglomeration", "% Total Agglomeration" and "% Redispersion", respectively, TBHB in the Table is the abbreviation for "Time Beyond Halogen Breakthrough". The symbol "I" represents "initial value" and the terms S-1, S-2 and S-3 represent values obtained after treatment for the catalyst in the first, second and third sections of the catalyst bed. The first section represents the entry section, and the third, the exit region.

In a related run, the catalyst described above was treated substantially the same as Example 1 except that no oxygen was added to the HCl stream after its concentration reached 90% at the outlet. The results are shown below in the Table as Example 1A.

As is seen from contrasting Examples 1 and 1A, near complete iridium redispersion was obtained when the present invention was practiced whereas treating the agglomerated catalyst with HCl in the absence of oxygen resulted in essentially no metal redispersion.

EXAMPLE 2

The catalyst of Example 1 was treated substantially the same as in Example 1 except that in the HCl+O$_2$ treatment, the gas flow rate was lowered from 500 to 110 cc/min and this treatment was continued for 329 minutes. The results are shown in the Table.

In a related run, the catalyst of Example 1 was treated in a similar manner as in Example 2 except that there was no hydrogen chloride pretreatment before the HCl/O$_2$ redispersion. During the HCl/O$_2$ treatment, the oxygen level was 2.8 volume percent and no water was added to the HCl/O$_2$ gaseous feedstream. The HCl+O$_2$ treatment was continued for 280 minutes. The results are shown in the Table as Example 2A.

As is seen from contrasting Examples 2 and 2A, omission of the hydrogen chloride treat before the HCl+O$_2$ treatment greatly reduced the extent of metal redispersion and, in particular, it resulted in the formation of iridium oxide agglomerates. The HCl pretreatment raised the catalyst chloride level from 0.67 to 1.8 weight percent.

EXAMPLE 3

The catalyst of Example 1 was treated in a similar manner as in Example 2 except that the treatment gases contained no water and in the HCl+O$_2$, treatment the concentration of oxygen was 27 volume percent. This treatment was continued for 45 minutes. At the end of this treatment, the inlet and outlet of the reactor were blocked off and the catalyst was soaked in the gas mixture for 3 hours. The results are shown in the Table.

Example 3 indicates that high oxygen concentration in the HCl+O$_2$ treat step was equally effective in metal redispersion. Furthermore, soaking the catalyst in the gaseous mixture appears to improve the redispersion of the catalyst situated near the reactor entrance.

EXAMPLE 4

An alumina catalyst containing 0.3 weight percent iridium and 0.3 weight percent platinum, based on the total weight of the catalyst, had been used in a commercial reformer in the production of C$_5$+ gasoline. Several weight percent of coke deposit was found on the catalyst. The catalyst was regenerated in the reactor with dilute oxygen up to a flame front temperature of 480° C., resulting in an iridium agglomeration of 47 percent and the carbon content of the regenerated catalyst was 0.18 weight percent. Sixty grams of this catalyst were charged into the reactor and the reactivation procedure used was substantially the same as Example 1 except that in the HCl+O$_2$ treatment, the concentration of HCl and oxygen were 1.2 and 20.6 volume percent, respectively. The results are shown in the Table.

Another portion of the same catalyst was regenerated in the reactor with dilute oxygen at a flame front temperature of 400° C. The carbon content of the regenerated catalyst was 0.62 weight percent. Sixty grams of this catalyst were charged into the reactor and the reactivation procedure used was exactly as in Example 4 except that the HCl+O$_2$ treatment was 153 minutes. The results are shown in the Table as Example 4A.

Examples 4 and 4A show that the present invention works well with coked catalyst. High degrees of metal redispersion were obtained when the present invention was practiced with coked catalyst, wherein the coke was removed by oxygen in the gas phase during redispersion under the high reaction temperature.

EXAMPLE 5

The catalyst of Example 4 was further decoked at 538° C. in air for 16 hours. After this treatment, the carbon content of the catalyst decreased to 0.1 weight percent. The coke-depleted catalyst suffered further metal agglomeration and X-ray diffraction showed essentially all the iridium was agglomerated. Sixty grams of this catalyst were charged into the reactor and were treated in a similar manner as in Example 4, except that no water was present in the treat gases and in the HCl+O$_2$ treatment, oxygen concentration was increased from 2 to 25 volume percent in four steps, which were: 2 volume percent for 15 minutes, 5.3 volume percent for 15 minutes, 13.0 volume percent for 19 minutes and 25 volume percent for 60 minutes. The results are shown in the Table.

As is seen from contrasting Examples 1 and 5, a higher degree of metal dispersion was obtained when no water was added to the treating gas and the oxygen concentration was increased in several steps. This stepwise increase in oxygen concentration is very advantageous when the present invention is used to redisperse catalysts containing substantial amounts of coke deposit. The limited oxygen concentration in the initial coke burn removes most of the coke and, at the same time, avoids uncontrolled temperature exotherms.

drogen halide volume ratio of about 1:5 to 100:1 and a hydrogen halide partial pressure of about 0.00005 to 0.1 MPa for a time sufficient to effect a substantial redispersion of said metallic iridium.

2. The process of claim 1 wherein said catalyst is initially present substantially as agglomerated metallic iridium.

3. The process of claim 1 wherein said catalyst is present on a catalyst support selected from silica, zeolite, alumina, silica-alumina, zirconia, alumina-zirconia, and mixtures thereof.

4. The process of claim 1 wherein said catalyst further contains a metal co-catalyst selected from platinum, rhodium, rhenium, palladium and mixtures thereof.

5. The process of claim 1 wherein sid halide-providing compound is one which generates a hydrogen halide in the presence of hydrogen gas.

6. The process of claim 5 wherein said halide-providing compound is selected from carbon tetrachloride, chloroform, methylene chloride, methyl chloride, 1,2-dichloroethane, hexachloroethane, and mixtures thereof, in the presence of hydrogen gas.

7. The process of claim 1 wherein said halide-providing compound is hydrogen chloride.

8. The process of claim 1 wherein said halide is present on the catalyst after step (a) in an amount of about 1.4 to 2.5 weight percent, taken as the coke-free, dry, catalyst.

9. The process of claim 1 wherein said catalyst after completion of step (a) is saturated with halide.

10. The process of claim 1 wherein said catalyst is platinum-iridium supported on alumina.

11. The process of claim 1 wherein said catalyst is platinum-iridium-rhenium supported on alumina.

12. The process of claim 1 wherein the temperature in step (a) is in the range of about 250° to 600° C.

13. The process of claim 1 wherein said hydrogen halide in step (b) is hydrogen chloride.

TABLE[a]

| Example | TI[b] | % Ir Agglom. S-1 | S-2 | S-3 | % IrO$_2$ Agglom. S-1 | S-2 | S-3 | % Total Agglom. S-1 | S-2 | S-3 | % Redis. S-1 | S-2 | S-3 |
|---|---|---|---|---|---|---|---|---|---|---|---|---|---|
| 1 | 100 | 28 | 14 | 0 | 0 | 0 | 0 | 28 | 14 | 0 | 72 | 86 | 100 |
| 1A | 100 | 95 | 92 | 101 | 0 | 0 | 0 | 95 | 92 | 101 | 5 | 8 | 0 |
| 2 | 100 | 5 | 0 | 0 | 0 | 0 | 0 | 5 | 0 | 0 | 95 | 100 | 100 |
| 2A | 100 | 32 | 38 | 62 | 7 | 10 | 15 | 39 | 48 | 77 | 61 | 52 | 23 |
| 3 | 100 | 0 | 0 | 0 | 0 | 0 | 0 | 0 | 0 | 0 | 100 | 100 | 100 |
| 4[c] | 47 | 11 | 15 | 9 | 0 | 0 | 0 | 11 | 15 | 9 | 76 | 68 | 81 |
| 4A[d] | 49 | 17 | 9 | 0 | 0 | 0 | 0 | 17 | 9 | 0 | 65 | 82 | 100 |
| 5 | 100 | 9 | 0 | 0 | 0 | 0 | 0 | 9 | 0 | 0 | 91 | 100 | 100 |

[a]S-1, S-2, S-3 are the entrance, middle and exit sections, respectively, after redispersion treatment.
[b]Total initial iridium agglomeration.
[c]% Carbon on catalyst: initial, 0.18; S-1, 0.06; S-2, 0.07; S-3, 0.07.
[d]% Carbon on catalyst: initial, 0.62; S-1, 0.08; S-2, 0.08; S-3, 0.08.

What is claimed is:

1. A process for reactivating a partially or completely decoked agglomerated catalyst containing metallic iridium comprising the steps of:
   (a) pretreating the catalyst by contact with a substantially elemental oxygen-free atmosphere comprising a halide-providing compound at elevated temperature to provide about 1.3 weight percent and above, halide to the catalyst, taken as the coke-free, dry catalyst; and
   (b) redispersing the metallic iridium from step (a), while maintaining said 1.3 weight percent halide provided to the catalyst, by contact with an atmosphere comprising hydrogen halide and elemental oxygen at elevated temperature at an oxygen:hy- 14. The process of claim 1 wherein said elemental oxygen and hydrogen halide are present in a respective volume ratio of about 2:1 to 60:1.

15. The process of claim 1 wherein said temperature in step (b) is in the range of about 450° to 600° C.

16. The process of claim 1 wherein said metallic iridium is 75 to 100 percent redispersed.

17. The process of claim 1 wherein said catalyst further contains iridium oxide which is contacted with a reducing atmosphere at elevated temperature to substantially convert said iridium oxide to metallic iridium prior to or concurrently with step (a).

18. The process of claim 17 wherein said reducing atmosphere comprises hydrogen gas.

19. The process of claim 17 wherein the temperature during said contacting with said reducing atmosphere is in the range of about 250° to 600° C.

20. A process for reactivating partially or completely decoked agglomerated platinum-iridium on alumina catalyst containing platinum and iridium oxides comprising the steps of:
   (a) contacting said agglomerated catalyst with a hydrogen atmosphere at a temperature in the range of about 300° to 540° C. and a pressure of about 0.1 to 2.0 MPa for a sufficient time to substantially convert said oxides of platinum and iridium to the respective metals;
   (b) pretreating the catalyst from step (a) by contact with an elemental oxygen-free atmosphere comprising hydrogen chloride at a temperature in the range of about 300° to 540° C. and a pressure of about 0.1 to 2.0 MPa to saturate the catalyst with chloride; and
   (c) redispersing the metallic platinum and iridium while maintaining a saturated catalyst chloride level by contact with an atmosphere comprising hydrogen chloride and elemental oxygen in an oxygen/hydrogen chloride volume ratio of about 4:1 to 20:1, at a temperature in the range of about 500° to 540° C. for a sufficient time to effect about a 75 to 100 percent redispersion of both metallic platinum and iridium.

21. A process for reactivating an agglomerated metallic platinum-iridium on alumina catalyst, which has been partially decoked by hydrogen gas, comprising the steps of:
   (a) pretreating said catalyst by contact with an elemental oxygen-free atmosphere comprising hydrogen chloride at a temperature in the range of about 300° to 540° C. and a pressure of about 0.1 to 2.0 MPa to saturate the catalyst with chloride; and
   (b) redispersing the metallic platinum and iridium while maintaining a saturated catalyst chloride level by contact with an atmosphere comprising hydrogen chloride and elemental oxygen in an oxygen/hydrogen chloride volume ratio of about 4:1 to 20:1, at a temperature in the range of about 500° to 540° C. for a sufficient time to effect about a 75 to 100 percent redispersion of both metallic platinum and iridium.

* * * * *